(12) United States Patent
Calvez

(10) Patent No.: US 9,228,854 B2
(45) Date of Patent: Jan. 5, 2016

(54) METHOD FOR REMOTELY READING FLUID METERS, AND METER AND SERVER ASSOCIATED WITH SAID METHOD

(75) Inventor: Philippe Calvez, Guyancourt (FR)

(73) Assignee: SUEZ ENVIRONMENT (FR)

(*) Notice: Subject to any disclaimer, the term of this patent is extended or adjusted under 35 U.S.C. 154(b) by 199 days.

(21) Appl. No.: 14/129,516

(22) PCT Filed: Jun. 26, 2012

(86) PCT No.: PCT/IB2012/053219
§ 371 (c)(1),
(2), (4) Date: Jan. 24, 2014

(87) PCT Pub. No.: WO2013/001450
PCT Pub. Date: Jan. 3, 2013

(65) Prior Publication Data
US 2014/0191881 A1    Jul. 10, 2014

(30) Foreign Application Priority Data

Jun. 27, 2011   (FR) ...................................... 11 55664

(51) Int. Cl.
*G08B 21/00*   (2006.01)
*G01D 4/00*    (2006.01)
*H04Q 9/00*    (2006.01)
*G01D 21/00*   (2006.01)

(52) U.S. Cl.
CPC ............... *G01D 4/002* (2013.01); *G01D 21/00* (2013.01); *H04Q 9/00* (2013.01); *H04Q 2209/60* (2013.01); *H04Q 2209/845* (2013.01); *Y02B 90/241* (2013.01); *Y04S 20/32* (2013.01)

(58) Field of Classification Search
CPC ... G01D 21/00; G01D 4/002; H04Q 2209/60; H04Q 2209/845; Y04S 20/32
See application file for complete search history.

(56) References Cited

U.S. PATENT DOCUMENTS

| 2010/0034191 | A1* | 2/2010 | Schulz | G01D 21/00 370/350 |
| 2012/0126995 | A1* | 5/2012 | Sobotka | G01D 4/002 340/870.03 |
| 2012/0163520 | A1* | 6/2012 | Liu | G01S 5/0018 375/356 |
| 2013/0023763 | A1* | 1/2013 | Huennekens | G06Q 50/22 600/425 |

FOREIGN PATENT DOCUMENTS

EP          0809374          11/1997

* cited by examiner

*Primary Examiner* — Mark Rushing
(74) *Attorney, Agent, or Firm* — The Belles Group, P.C.

(57) ABSTRACT

The invention relates to a method for remotely reading fluid meters, according to which a meter comprises a module having a metering clock and a wireless transmitter for transmitting a frame of time-stamped remote-reading information to a server which comprises a server clock; after every N frames are transmitted, the meter module enters a receiving mode (Rx) for a period of time ($\Delta Rx$); upon receiving a frame of time-stamped information, the server determines the difference between the time information contained in the received frame and the time information provided by the server clock; then, if the difference is greater than a predetermined limit ($\Delta L$), the server sends a reset message to the meter; upon receiving the reset message, the module of the meter updates the meter clock.

12 Claims, 2 Drawing Sheets

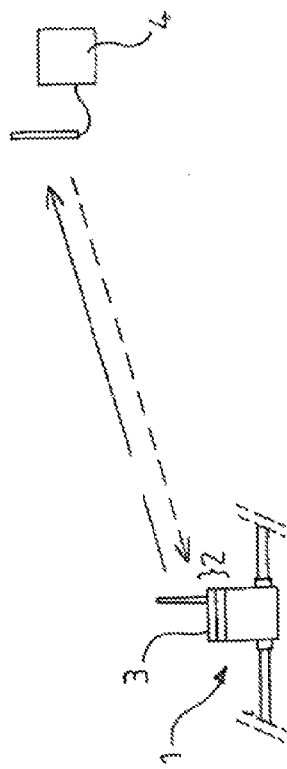

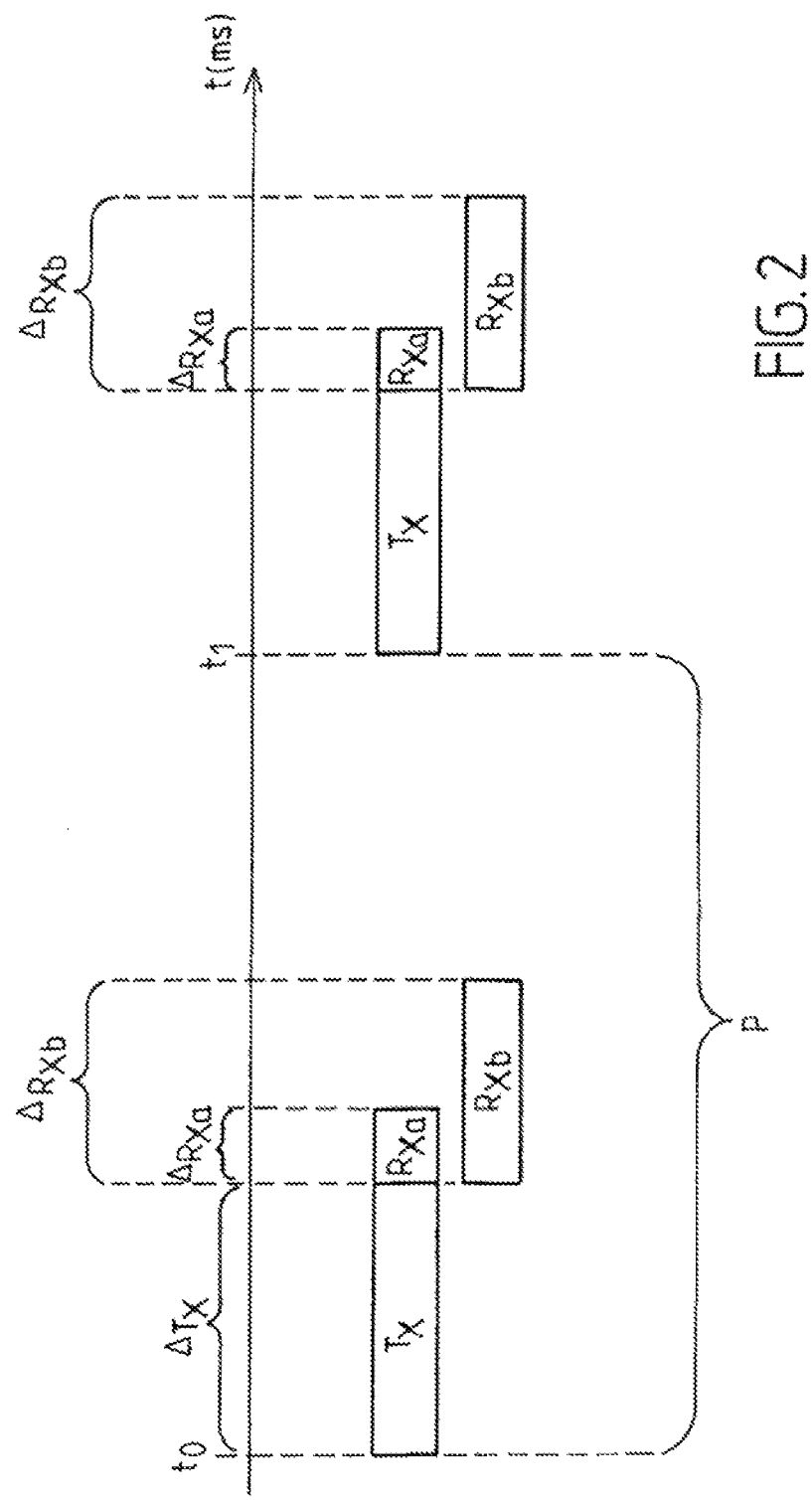

METHOD FOR REMOTELY READING FLUID METERS, AND METER AND SERVER ASSOCIATED WITH SAID METHOD

PRIORITY

Priority is claimed as a national stage application, under 35 U.S.C. §371, to international application No. PCT/IB2012/053219, filed Jun. 26, 2012, which claims priority to French application 1155664, filed Jun. 27, 2011. The disclosures of the aforementioned priority applications are incorporated herein by reference in their entirety.

The present invention relates to a method for remotely reading fluid meters, according to which a meter has a module having a meter clock and a radio transmitter for transmitting a frame of time-stamped remote-reading information to a server which has a server clock.

The invention also pertains to the specific meter and server associated with this method.

The invention pertains more particularly, but not exclusively, to water and gas meters.

In a conventional radio frequency remote reading network, the transmitters of the meters transmit their data according to a pre-established ephemeris with a determined periodicity. The transmitters are programmed, for example, to carry out a measurement or a transmission at 6 h00, 12 h00, 18 h00 and 24 h00.

The transmitters, powered by electric cell, are designed to operate over a period in the order of 15 to 20 years. In order to reduce the cost of these products, cheap quartz crystals of relatively low quality are used. Conventionally the quartz clocks of the meters have an intrinsic precision in the order of +/−20 parts per million (ppm) and a drift due to aging in the order of +/−3 parts per million (ppm) per year. It is therefore possible to have, at the end of 10 years, a time discrepancy in the order of 40, or more, parts per million. This means that the clock may have acquired a discrepancy of 1.4 hours after 10 years and 5.5 hours after 20 years.

As a consequence, the instants of measurement (and, respectively, of transmission) of the transmitters also differ in time and the transmission dates initially programmed with respect to an absolute time, generally UTC (Coordinated Universal Time), are no longer observed.

The main difficulty therefore lies in the regular updating of the clock of the transmitters via the remote-reading radio frequency network.

In networked systems, the NTP protocol is used. Clients regularly request updates from a server. The server returns its time and the times of arrival of the request from the client and of departure of the reply from the server. The client, knowing the time it transmitted its request and the time it received the reply, can thus calculate the time difference between its internal clock and the reference clock and the propagation time for the messages in the network.

Systems providing regular time updates, for example once day, can also be implemented.

Such updates generate a heavy stream of data on the network, which has an impact on its dimensioning.

In a fixed remote-reading network system, various architectures can be found for reading a meter at a given time: the radio module connected to the meter is either two-way (transmitter/receiver) or one-way.

Of more particular interest is the case of short-range fixed remote-reading networks (ISM band 868 MHz or 433 MHz).

In the case of a two-way meter, the module in receiving mode "listens" to the radio link while waiting for an order to take a reading. This order comes from a network entity synchronized with a reference (e.g. server connected to the Internet synchronized by NTP.) The implementation of a true two-way network with meter modules in permanent listening/receiving mode is complex, requires a cumbersome infrastructure and consumes a good deal of energy from the cells of the meters.

In the case of a one-way meter, transmission-only modules transmit the value of the read meter every x seconds, x varying from 10 to 40 seconds. Synchronized receivers, for example gateway GPRS synchronized by NTP, or a GPS-synchronized appliance, then "listen" to the transmitter at the desired time. The time error on the measurement is in the order of the transmission frequency of the transmitter, i.e. a few seconds.

Such approaches require the transmission of a large volume of data, which influences the dimensioning of the network and likewise has a heavy impact on the power consumption of the meter or on the range of the transmitter. In the case of a cell-operated meter, this translates into poor autonomy for the meter.

Additionally, using more precise clocks would generate a high cost.

In view of these various drawbacks and difficulties, the aim of the invention is above all to provide a method making it possible to guarantee reliable time-stamping of the remotely-read information without a consequent negative impact, as much on the dimensioning and the cost of the network as on the power consumption of the meter and its autonomy when it is battery or cell operated.

According to the invention, a method for remotely reading fluid meters, according to which a meter has a module having a meter clock and a radio transmitter/receiver for transmitting a frame of time-stamped remote-reading information to a server which has a server clock and a radio transmitter/receiver, is characterized in that:

every N frames transmitted, the module of the meter enters receiving mode (Rx) for a determined period of time ($\Delta Rx$), after transmission of the frame, upon receiving a frame of time-stamped information, the server determines the discrepancy between the time information contained in the received frame and the time information provided by the server clock, then, if the discrepancy is greater than a predetermined limit ($\Delta L$), the server transmits a reset message to the meter, upon receiving the reset message, the module of the meter updates the meter clock.

The number N of transmitted frames after which the meter module enters receiving mode is generally an integer number greater than 1. The predetermined limit ($\Delta L$) of the discrepancy for the transmission of a reset message can be between 30 seconds and 2 minutes, in particular equal to 1 minute.

Advantageously, the reset message has an immediate correction instruction for compensating for the determined discrepancy, and a periodical correction instruction for removing or reducing future discrepancies, in particular due to aging.

Preferably, the meter module enters transmitting mode, if necessary followed by a receiving mode, according to a period P, for returning to the quiescent state between transmissions in order to save energy. The period P can be 4 hours or a multiple of 4 hours.

The time $\Delta Rx$ over which the meter clock enters receiving mode can be between 60 ms (milliseconds) and 200 ms, in particular equal to 120 ms (milliseconds).

The receiving mode Rx can have two phases, a first phase Rxa of a duration $\Delta Rxa$ being implemented by default, and when, during the course of this first phase, the meter module begins to receive a reset message, the meter module enters, in a second phase, receiving mode Rb, for a duration ΔRxb greater than that ΔRxa of the first phase.

The duration ΔRxa of the first phase of the receiving mode can be between 2 and 5 ms, in particular equal to 3 ms. The duration ΔRxb can be between 60 ms (milliseconds) and 200 ms, in particular equal to 120 ms (milliseconds).

Preferably, the meter has an identifier included in each frame of time-stamped information transmitted to the server.

Following a consumption measurement, the transmission of the frame of time-stamped information can be deferred in time according to a predefined program, the server using the identifier of the meter to identify the corresponding program and to take into account the deferred transmission of the frame in the calculation of the discrepancy.

The invention also relates to a fluid meter, in particular for water or gas, comprising a metering device, a module with a meter clock, a radio transmitter and a radio receiver, and a means for updating the meter clock, making it suitable for use according to the method defined previously.

The invention also relates to a server comprising a transmitter and a receiver, a server clock and a means for measuring a discrepancy, making it suitable for use according to the method defined previously.

Other features and advantages of the invention will appear in the following description of a preferred embodiment with reference to the appended drawings, which description is nonlimiting in nature. In these drawings:

FIG. 1 is a diagram of a water meter, with remote-reading module, communicating with a server, FIG. 2 is a diagram illustrating the transmissions between the meter and the server, and FIG. 3 is a table of an example of discrepancies and corrections.

In the case of a long-distance fixed remote-reading network using the 169 MHz band for a range between 50 meters and several kilometers, the modules of the meters are one-way with only one transmitter which transmits a frame of information between 4 and 12 times per day, in order to save batteries or cells.

During the production phase, the transmitters are calibrated in such a way as to reduce the initial error in their frequency reference, but a time drift in the clock of the meter subsists.

According to the invention, to remove or reduce this time drift of the clock, without complicating the network or substantially increasing the energy consumption of the meter module, a reduced-function two-way mode is set up by which the fixed network can slave the clock of the transmitter of the meter.

With reference to FIG. 1, a water meter 1 can be seen, having a module 2 with a meter clock and a radio transmitter 3 for transmitting a frame of time-stamped remote-reading information to a server 4 which has a server clock, a receiver and a transmitter.

The clock of the meter module is a quartz clock that exhibits two types of drift: an intrinsic drift, positive or negative, that results directly from production, and a, positive or negative, drift due to aging with respect to the universal reference time. The meter module has a means for updating its clock.

The transmissions between the meter or meters 1 and the server 4 are shown schematically in FIG. 2 and are carried out as follows, according to the invention.

The network at the server 4 is synchronized with universal time UTC by an NTP-type system. Therefore, all the messages received by the server 4 from a meter 1 are time-stamped with respect to UTC with a precision greater than one second. It is possible to disregard the propagation time of the electric radio wave and it will be supposed that the time of transmission of the messages is equal to their time of reception, which is enough for the desired precision.

At the time t0, the module of the meter enters transmitting mode Tx over a time ΔTx of between 60 ms and 200 ms, in particular equal to 120 ms, and transmits a message containing a frame of time-stamped information coded over 8 bits comprising a read measurement and the serial number of the meter.

As a function of the serial number of the meter, various fields of the message, and the time UTC of reception of the message, the server 4 is programmed to determine the instant at which the measurement has been taken by the module of the meter 1.

Additionally, the server identifies the transmission ephemeris of the transmitting module of the meter, that is to say the supposed transmission instants for the meter. The server 4 is programmed to determine, at the end of several receptions, the value of the frequency drift of the clock of the meter. This drift corresponds to the difference between the theoretical universal time at which the measurement was predicted according to the ephemeris and the effective universal time of the measurement. This drift can be negative or positive according to whether the clock of the meter is behind or ahead with respect to the universal time.

Once this drift has been calculated, a command to correct the drift can be simply transmitted in the form:
  of an immediate time setting
  and of the number of hours after which the meter module will have to use its updating means for systematically removing or adding a determined time value, notably one second, from/to its internal clock or meter clock.

This command will be sent only when the separation between the real reception time of the message and the theoretical reception time of the message will be greater than a predetermined limit ΔL, advantageously between 30 seconds and 2 minutes, in particular equal to 1 minute.

When the transmission time ΔTx, notably of 120 ms, has elapsed, the meter module enters receiving mode Rx, which advantageously has two phases. A first phase Rxa of a reduced duration ΔRxa, notably of 3 ms, is implemented by default.

If, during the phase Rxa and the time ΔRxa, the meter does not receive a message, the receiving mode is interrupted and the meter awaits the next sequence of communication beginning at the time t1 at the end of a period P, in particular of 4 hours.

If, during the phase Rxa, the meter module begins to receive a reset message, the meter module enters, in a second phase, receiving mode Rxb, over a duration ΔRxb greater than that ΔRxa of the first phase. The duration ΔRxb is preferably between 60 ms (milliseconds) and 200 ms, in particular equal to 120 ms (milliseconds).

When the reset message has been received in totality, the meter module exits the receiving mode Rxb and ceases to communicate until the time T1 at the end of the four-hour period P.

In the case where the server 4 has determined a drift due to aging in the order of 3 parts per million per year, this drift is in the order of $3\times(365\times24\times60)/10^6$, i.e. in the order of 1.58 minutes/year, i.e. 94.8 sec/year, i.e. approximately 7.9 sec/month.

If the clock of the transmitter of the meter meter is ahead of the universal time, a correction command will be sent by the server 4 when the separation between the real time of reception of the message and the theoretical time of reception of the message will be greater than the predetermined limit ΔL, notably 1 minute.

In response to this command, the transmitter module of the meter will:

immediately subtract one minute per hour from its internal clock, subtract 1 second from its internal clock every 92.6 hours (the aging drift is 7.9 sec/month, i.e. 7.9 sec/30.5×24 h, i.e. 7.9 sec/732 h, i.e. 1 sec/92.6 h).

To clarify the method, a set of reset values is given in the form of a table in FIG. 3 for a clock precise to 20 ppm at the instant t0 (initial uncertainty) and having an annual drift due to aging of 3 ppm per year.

The table in FIG. 3 has a first line titled: Date in Year and two groups of three lines titled: Max drift in minutes; Max drift in hours; Clock update cycle.

The first group of three lines corresponds to a clock without calibration (without correction of the initial uncertainty). The maximum drift for the first year is 23 parts per million per year, i.e. expressed in minutes:

$23 \times (365 \times 24 \times 60)$ mn/$10^6$ approximately 12.09 minutes, rounded to 12.1 mn. The total drift is therefore in the order of 1 minute per month. The update cycle for subtracting 1 second from the internal clock will be 12.08 h the first year. The values for the other years are given in the table.

The second group of three lines corresponds to a clock with calibration (initial uncertainty corrected). For the first year, the drift of 3 ppm per year (aging) is approximately 1.6 minutes per year, i.e. 7.9 sec/month, i.e. 1 sec/92.59 h). The update cycle for subtracting 1 second from the internal clock will therefore be 92.59 h the first year. For the second year, the aging drift of 6 ppm per year leads to a drift of 4.7 minutes per year and to an update cycle every 30.86 hours.

And so on for the following years.

The device according to the invention has many advantages.

It makes it possible to obtain consumption information at fixed dates, without notable errors, which is a requirement of some consumers.

Without correction, the meter clock can acquire 12 minutes of discrepancy in one year, i.e. 5.5 hours over 20 years, the estimated life of a meter. Such a discrepancy is often unacceptable.

However, the correction of the meter clock is carried out without necessitating a cumbersome or costly infrastructure, even when transmitting over long distances.

The correction messages have a very small size, in the order of 8 bits, and therefore do not encumber the network.

The fact of working in a reduced-function two-way mode makes it possible to use only a single frequency and to avoid recourse to an overly cumbersome infrastructure. Indeed a true two-way network would necessitate the implementation of cumbersome communications protocols.

The invention applies to all types of fluid meter, particularly water and gas meters, but also to electricity meters, the electric current being likened to a fluid.

The invention claimed is:

1. A method for remotely reading fluid meters, wherein a meter has a module having a meter clock and a radio transmitter/receiver for transmitting a frame of time-stamped remote-reading information to a server which has a server clock and a radio transmitter/receiver, the method comprising:

every N frames transmitted, the module of the meter enters receiving mode (Rx) for a determined period of time ($\Delta Rx$), after transmission of the frame, upon receiving a frame of time-stamped information, the server determines the discrepancy between the time information contained in the received frame and the time information provided by the server clock, then, if the discrepancy is greater than a predetermined limit ($\Delta L$), the server transmits a reset message to the meter, upon receiving the reset message, the module of the meter updates the meter clock.

2. The remote-reading method as claimed in claim 1, wherein the number N of transmitted frames after which the meter module enters receiving mode is an integer number greater than 1.

3. The remote-reading method as claimed in claim 1, wherein the predetermined limit ($\Delta L$) of the discrepancy for the transmission of a reset message is between 30 seconds and 2 minutes, in particular equal to 1 minute.

4. The remote-reading method as claimed in claim 1, wherein the reset message has an immediate correction instruction for compensating for the determined discrepancy, and a periodical correction instruction for removing or reducing future discrepancies.

5. The remote-reading method as claimed in claim 1, wherein the meter module enters transmitting mode (Tx), if necessary followed by a receiving mode, according to a period (P), for returning to the quiescent state between transmissions in order to save energy.

6. The remote-reading method as claimed in claim 1, wherein the receiving mode (Rx) has two phases, a first phase (Rxa) of a duration ($\Delta Rxa$) being implemented by default, and when, during the course of this first phase, the meter module begins to receive a reset message, the meter module enters, in a second phase, receiving mode (Rxb), for a duration ($\Delta Rxb$) greater than that ($\Delta Rxa$) of the first phase.

7. The remote-reading method as claimed in claim 6, wherein the duration ($\Delta Rxa$) of the first phase of the receiving mode is between 2 and 5 ms, in particular equal to 3 ms.

8. The remote-reading method as claimed in claim 1, wherein the time ($\Delta Rx$) over which the meter module enters receiving mode is between 60 ms and 200 ms, in particular equal to 120 ms.

9. The remote-reading method as claimed in claim 1, wherein the meter has an identifier included in each frame of time-stamped information transmitted to the server.

10. The remote-reading method as claimed in claim 9, wherein, following a consumption measurement, the transmission of the frame of time-stamped information is deferred in time according to a predefined program, the server using the identifier of the meter to identify the corresponding program and to take into account the deferred transmission of the frame in the calculation of the discrepancy.

11. A fluid meter, in particular a water or gas meter, comprising a metering device, a module with a meter clock, a radio transmitter, a radio receiver and a means for updating the meter clock, making it suitable for use according to the method as claimed in claim 1.

12. A server comprising a transmitter and a receiver, a server clock and a means for measuring a discrepancy, making it suitable for use according to the method as claimed in claim 1.

* * * * *